United States Patent
Ishikawa et al.

(10) Patent No.: US 9,266,740 B2
(45) Date of Patent: Feb. 23, 2016

(54) PROCESS FOR MANUFACTURING POROUS CARBON MATERIAL

(71) Applicant: Sumitomo Electric Industries, Ltd., Osaka-shi (JP)

(72) Inventors: Shinji Ishikawa, Yokohama (JP); Masatoshi Majima, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/389,992

(22) PCT Filed: Mar. 27, 2013

(86) PCT No.: PCT/JP2013/059064
§ 371 (c)(1),
(2) Date: Oct. 1, 2014

(87) PCT Pub. No.: WO2013/015941
PCT Pub. Date: Oct. 10, 2013

(65) Prior Publication Data
US 2015/0071847 A1 Mar. 12, 2015

(30) Foreign Application Priority Data
Apr. 2, 2012 (JP) .................................. 2012-083915

(51) Int. Cl.
*C01B 31/02* (2006.01)
*C01B 31/10* (2006.01)

(52) U.S. Cl.
CPC ................. *C01B 31/10* (2013.01); *C01B 31/02* (2013.01)

(58) Field of Classification Search
CPC ...................................................... C01B 31/02
See application file for complete search history.

(56) References Cited

U.S. PATENT DOCUMENTS 3,066,099 A    11/1962 Mohun

FOREIGN PATENT DOCUMENTS

| CN | 101181990 A | 5/2008 |
|----|-------------|--------|
| JP | 02-184511 A | 7/1990 |
| JP | 2004-513529 A | 4/2004 |
| WO | WO-90/05994 A1 | 5/1990 |

OTHER PUBLICATIONS

International Preliminary Report on Patentability in PCT International Application No. PCT/JP2013/059064, dated Oct. 16, 2014.
Volker Presser et al., "Carbide-Derived Carbons—From Porous Networks to Nanotubes and Graphene," Advanced Functional Materials, 2011, pp. 810-833.
International Search Report in PCT International Application No. PCT/JP2013/059064, dated May 14, 2013.
Notification of First Office Action in Chinese Patent Application No. 201380018461.5, dated Jun. 18, 2015.

*Primary Examiner* — Stuart Hendrickson
(74) *Attorney, Agent, or Firm* — Venable LLP; Michael A. Sartori

(57) ABSTRACT

This manufacturing process has: a step of performing a heating treatment in a contact state of SiC with $Cl_2$ to form a porous carbon material; a step of reacting $SiCl_4$ formed along with the porous carbon material in the foregoing step, with Zn to extract Si; and a step of reacting Si extracted in the foregoing step, with C to form SiC, and the process further has: a step of reducing $ZnCl_2$ formed by reaction of $SiCl_4$ with Zn, to extract Zn and $Cl_2$. These steps are repetitively carried out, SiC extracted by the step of forming SiC is used in the step of forming the porous carbon material, $Cl_2$ extracted by reduction of $ZnCl_2$ is used in the step of forming the porous carbon, and Zn extracted by reduction of $ZnCl_2$ is used in the reaction step of $SiCl_4$ with Zn.

10 Claims, 12 Drawing Sheets

Fig. 7

| Chloride name | Melting point | Boiling point |
|---|---|---|
| $SiCl_4$ | -70 | 57.6 |
| $TiCl_4$ | 39 | 230 |
| $BCl_3$ | -107 | 12.5 |
| $WCl_5$ | 276 | 333 |
| $Al_2Cl_6$ | 190 (under 2.5 atm) | 182.7 |
| $FeCl_3$ | 306 | sublime not less than 300°C |
| $CaCl_2$ | 772 | not less than 1600 |

Fig. 8

| Metal | Melting point | Boiling point | Chloride | Melting point | Boiling point |
|---|---|---|---|---|---|
| Zn | 419.6 | 907 | $ZnCl_2$ | 283 | 732 |
| Mg | 648.8 | 1090 | $MgCl_2$ | 714 | 1410 |
| Na | 97.8 | 882.9 | NaCl | 801 | 1413 |
| K | 63.7 | 774 | KCl | 770 | 1510 |
| Ca | 839 | 1480 | $CaCl_2$ | 772 | 1600 |
| Sr | 769 | 1380 | $SrCl_2$ | 873 | 1250 |
| Ba | 725 | 1640 | $BaCl_2$ | 962 | 1560 |
| Cu | 1083 | 2570 | CuCl | 430 | 1490 |

Fig.9

| Temperature (°C) | Specific surface area by BET (m²/g) | Pore volume (cc/g) | Average pore size (nm) |
|---|---|---|---|
| 900 | 1060 | 0.45 | 0.55 |
| 1000 | 1120 | 0.51 | 0.56 |
| 1100 | 1280 | 0.56 | 0.61 |
| 1200 | 1250 | 0.54 | 0.62 |
| 1300 | 1210 | 0.53 | 0.63 |
| 1400 | 1180 | 0.52 | 0.65 |
| 1500 | 1000 | 0.46 | 0.71 |

Fig.10

| Temperature (°C) | Specific surface area by BET (m²/g) | Pore volume (cc/g) | Average pore size (nm) |
|---|---|---|---|
| 800 | 1600 | 0.70 | 0.58 |
| 900 | 1650 | 0.73 | 0.60 |
| 1000 | 1580 | 0.75 | 0.65 |
| 1100 | 1320 | 0.85 | 0.91 |
| 1200 | 1010 | 0.82 | 1.04 |
| 1300 | 800 | 0.79 | 1.50 |
| 1400 | 370 | 0.59 | 2.37 |

PROCESS FOR MANUFACTURING POROUS CARBON MATERIAL

TECHNICAL FIELD

The present invention relates to a process for manufacturing a porous carbon material.

BACKGROUND ART

Patent Literature 1 describes a process for manufacturing porous activated carbon. Furthermore, Patent Literature 2 describes a process for manufacturing a graphite material which is porous and which has a high specific surface area. Patent Literatures 1 and 2 disclose formation of porous carbon by reaction between silicon carbide (SiC) and chlorine gas ($Cl_2$).

Non Patent Literature 1 shows that carbon materials with nanosized micropores can be formed by subjecting metal carbides to a chlorination treatment. Examples of the metal carbides described therein include SiC, TiC, $B_4C$, $Al_4C_3$, and so on. Furthermore, it is shown that the porosities and pore size distributions of the carbon materials are different depending upon types of the metal carbides.

CITATION LIST

Patent Literatures

Patent Literature 1: U.S. Pat. No. 3,066,099
Patent Literature 2: Japanese Patent Application Laid-Open Publication No. H02-184511

Non Patent Literature

Non Patent Literature 1: Volker Presser, Min Heon, and Yury Gogotsi, 'Carbide-Derived Carbons—From Porous Networks to Nanotubes and Graphene,' ADVANCED FUNCTIONAL MATERIALS, pp. 810-833 (2011)

SUMMARY OF INVENTION

Technical Problems

As described in the foregoing Literatures, there is the process of reacting the metal carbide such as SiC or TiC with chlorine gas, as a process for forming the porous carbon material. During this reaction, a metal chloride ($SiCl_4$ or $TiCl_4$ or the like) is also formed at the same time, and the conventional processes mainly adopt a method of vaporizing the metal chloride, thereby achieving elimination thereof. However, large quantities of chlorine gas must be consumed in industrially manufacturing the porous carbon material, which will raise problems of heavy environmental burden and high production cost.

The present invention has been accomplished in view of the problems as described above, and it is an object of the present invention to provide a process for manufacturing a porous carbon material, which can reduce the environmental burden and keep the production cost down.

Solution to Problems

In order to solve the aforementioned problems, a process for manufacturing a porous carbon material according to one aspect of the present invention is a process comprising: a porous carbon forming step of performing a heating treatment in a contact state of a metal carbide, which is a compound of a first metal and carbon, with chlorine gas, to form a porous carbon material; a first metal reduction step of reacting a first metal chloride formed along with the porous carbon material in the porous carbon forming step, with a second metal, to extract the first metal; and a metal carbide forming step of reacting the first metal extracted in the first metal reduction step, with carbon to form the metal carbide, the process further comprising: a second metal reduction step of reducing a second metal chloride formed along with the first metal in the first metal reduction step, to extract the second metal and chlorine gas, after the first metal reduction step, wherein the porous carbon forming step, the first metal reduction step, the metal carbide forming step, and the second metal reduction step are repetitively carried out, wherein the metal carbide extracted by the metal carbide forming step is used in the porous carbon forming step, wherein the chlorine gas extracted by the second metal reduction step is used in the porous carbon forming step, and wherein the second metal extracted by the second metal reduction step is used in the first metal reduction step.

In the aforementioned process for manufacturing the porous carbon material, the porous carbon forming step is to react the metal carbide (SiC or TiC or the like) with chlorine gas ($Cl_2$) to form the porous carbon. During this step, the first metal chloride ($SiCl_4$, $TiCl_4$, or the like) is formed at the same time. This first metal chloride is reduced in the first metal reduction step to extract the first metal (Si, Ti, or the like). The first metal extracted in this manner is carbonized in the metal carbide forming step to form the metal carbide (SiC, TiC, or the like). This metal carbide is used again in the aforementioned porous carbon forming step.

Furthermore, the second metal chloride ($ZnCl_2$, $MgCl_2$, or the like) is also formed in the first metal reduction step, and this second metal chloride is reduced in the second metal reduction step to be separated into the second metal (Zn, Mg, or the like) and chlorine gas ($Cl_2$). The second metal obtained in this manner is used again in the aforementioned first metal reduction step. Furthermore, the chlorine gas is used again in the foregoing porous carbon forming step.

As described above, all the materials other than carbon, which are used in forming the porous carbon, are reused in the foregoing process for manufacturing the porous carbon material. Therefore, this manufacturing process can reduce the environmental burden and keep the production cost down. The porous carbon material manufactured by the present process can be widely applied, for example, to electrodes of batteries, electric double layer capacitors, and others, catalyst carriers, activated carbon, and so on. Furthermore, there are no restrictions on the order of the metal carbide forming step and the second metal reduction step. Namely, the metal carbide forming step can be carried out first, or the second metal reduction step may be carried out first, or these steps can be carried out in parallel.

Furthermore, the process for manufacturing the porous carbon material may be characterized in that the metal carbide used in the porous carbon forming step is powdery or porous. When the metal carbide is powdery or porous, the first metal efficiently comes out of the metal carbide, which can reduce the manufacturing time of the porous carbon material. The term "porous" stated herein refers to a state in which powder particles are coupled, and the pore sizes thereof can be not less than 0.1 μm.

Furthermore, the process for manufacturing the porous carbon material may be characterized in that the metal carbide includes at least one of $Al_4C_3$, $B_4C$, $CaC_2$, $Cr_3C_2$, $Fe_3C$, SiC, $ThC_2$, TiC, $UC_2$, WC, and MoC. This makes it feasible to suitably perform the aforementioned porous carbon forming step and first metal reduction step.

Furthermore, the process for manufacturing the porous carbon material allows the porous carbon forming step to be carried out in such a manner that the metal carbide is placed in a mixed gas atmosphere of the chlorine gas and an inert gas, or in an atmosphere of the chlorine gas and that the mixed gas atmosphere or the chlorine gas atmosphere is heated at a temperature of not less than 500° C. and not more than 1500° C.

Furthermore, the process for manufacturing the porous carbon material may be characterized in that the second metal is any one of a Group 1 element, a Group 2 element, a Group 11 element, and a Group 12 element. This allows the aforementioned first and second metal reduction steps to be suitably carried out.

Furthermore, the porous carbon forming step can be carried out in such a manner that the metal carbide is SiC, that the metal carbide is placed in a mixed gas atmosphere of the chlorine gas and an inert gas, or in an atmosphere of the chlorine gas, and that the mixed gas atmosphere or the chlorine gas atmosphere is heated at a temperature of not less than 900° C. and not more than 1300° C. When SiC is a raw material, there are advantages that the raw material is relatively inexpensive and that the step of forming the raw material SiC by reaction between the metal silicon and carbon being the reaction products after electrolysis readily proceeds at a temperature not less than the melting point of metal silicon. In addition, the specific surface area takes a maximum in the chlorine treatment temperature range of 900 to 1300° C., so as to provide a good characteristic as activated carbon.

Furthermore, the porous carbon forming step can be carried out in such a manner that the metal carbide is TiC, that the metal carbide is placed in a mixed gas atmosphere of the chlorine gas and an inert gas, or in an atmosphere of the chlorine gas, and that the mixed gas atmosphere or the chlorine gas atmosphere is heated at a temperature of not less than 600° C. and not more than 1000° C. When TiC is a raw material, there are advantages that the reaction temperature is relatively low and that the step of forming the raw material TiC by reaction between metal titanium and carbon being the reaction products after electrolysis readily proceeds at a temperature not less than the melting point of the metal. In addition, the specific surface area takes a maximum in the chlorine treatment temperature range of 600 to 1000° C., and the value thereof is larger than that in the case of the SiC raw material, so as to provide a good characteristic as activated carbon.

Furthermore, the second metal can be any one of a Group 1 element, a Group 2 element, a Group 11 element, and a Group 12 element. The foregoing metals are preferred because they can be chlorinated by reaction with a metal chloride. Furthermore, it is more preferable to adopt one with a high vapor pressure in the form of a metal alone and with a low melting point in the form of a chloride thereof. In addition, it is also more preferable to adopt one that does not form a solid solution with the metal component.

Furthermore, in the porous carbon forming step, the metal carbide can be SiC and the second metal can be Zn. Zn is a preferred material because it does not form a solid solution with silicon in combination reaction with $SiCl_4$, the melting point of its chloride is relatively low, and the vapor pressure of the metal is high.

Furthermore, in the porous carbon forming step, the metal carbide can be TiC and the second metal can be Mg. Mg is a preferred material because it does not form a solid solution with Ti in combination with $TiCl_4$, the melting point of its chloride obtained is relatively low, and the vapor pressure of the metal is high.

Advantageous Effects of Invention

The process for manufacturing the porous carbon material according to one aspect of the present invention successfully achieves the reduction of the environmental burden while keeping the production cost down.

BRIEF DESCRIPTION OF DRAWINGS

FIG. 7 is a table showing the melting points and boiling points of metal chlorides.

FIG. 8 is a table showing the melting points and boiling points of metals and metal chlorides thereof.

FIG. 9 is a table showing changes of surface physical properties depending upon chlorine treatment temperatures.

FIG. 10 is a table showing changes of surface physical properties depending upon chlorine treatment temperatures.

DESCRIPTION OF EMBODIMENTS

One embodiment of the present invention will be described below in detail with reference to the accompanying drawings. In the description of the drawings the same elements will be denoted by the same reference signs, without redundant description.

Figure 1:
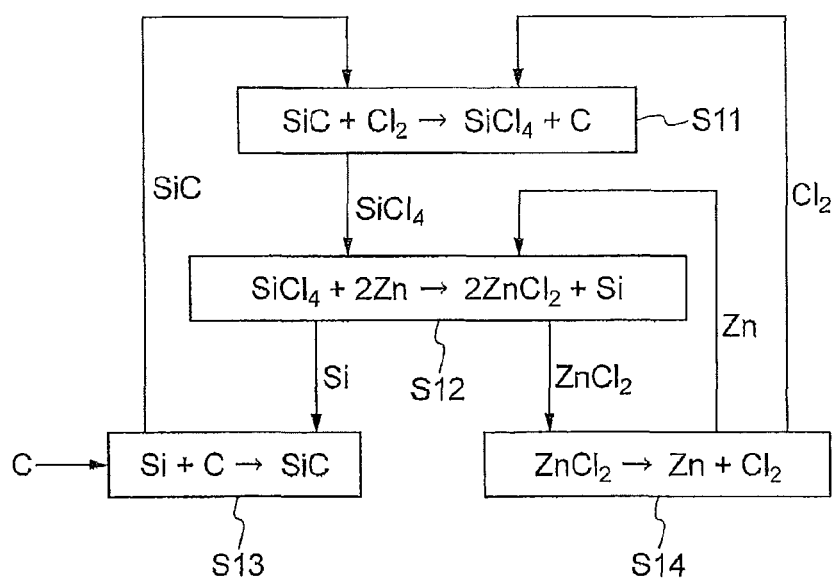
FIG. 1 is a drawing showing each of steps in a process for manufacturing a porous carbon material according to an embodiment.

FIG. 1 is a drawing showing each of steps in a process for manufacturing a porous carbon material according to an embodiment. As shown in FIG. 1, the manufacturing process according to the present embodiment has a porous carbon forming step S11, a first metal reduction step S12, a metal carbide forming step S13, and a second metal reduction step S14, and these steps S11 to S14 are repetitively carried out to continuously produce the porous carbon material, for example, with a large number of pores having the inner diameter of several nanometers.

The porous carbon forming step S11 is to perform a heating treatment in a contact state of a metal carbide, which is a compound of a first metal and carbon, with chlorine gas ($Cl_2$), thereby to form the porous carbon material. When the first metal is represented by $M^1$, this porous carbon forming step S11 is expressed by Chemical Formula (1) below. It is noted that X is an integer of not less than 1.

$$M^1C + XCl_2 \rightarrow M^1Cl_2X + C \qquad (1)$$

When the first metal $M^1$ is, for example, Si, this porous carbon forming step S11 is expressed by Chemical Formula (2) below.

$$SiC + 2Cl_2 \rightarrow SiCl_4 + C \qquad (2)$$

In this step, the first metal $M^1$ reacts with chlorine gas $Cl_2$ in a crystal comprised of the first metal $M^1$ and carbon, whereby only the first metal $M^1$ comes out of the crystal, to form a porous carbon structure. In this step, for example, powdery metal carbide $M^1C$ is placed in a mixed gas atmosphere of chlorine gas $Cl_2$ and inert gas ($N_2$, He, Ar, Ne, Xe, and so on), or in a substantially 100% chlorine gas atmosphere, and the mixed gas atmosphere or the chlorine gas atmosphere is heated at a high temperature. At this time, possible temperatures of the mixed gas atmosphere or the chlorine gas atmosphere are, for example, not less than 500° C. and not more than 1500° C.

Here, the metal carbide $M^1C$ can include at least one of $Al_4C_3$, $B_4C$, $CaC_2$, $Cr_3C_2$, $Fe_3C$, SiC, $ThC_2$, TiC, $UC_2$, WC, and MoC. In that case, the first metal $M^1$ is at least one of Al, B, Ca, Cr, Fe, Si, Th, Ti, U, W, and Mo. Particularly, the metal carbide $M^1C$ is more preferably one of SiC, TiC, $B_4C$, and WC. Since the melting points of chlorides formed by chlorination of these carbides are relatively low as shown in the table of FIG. 7 (the table showing metal chlorides and their melting points and boiling points), it is easy to perform a condensation process thereof and thus such carbides are advantageous. Although the boiling point of $WCl_5$ is not less than 300° C., W is a rare metal and thus it is advantageous in terms of added value.

Furthermore, this step results in obtaining the first metal chloride ($M^1Cl_{2X}$ in Chemical Formula (1) or $SiCl_4$ in Chemical Formula (2)), together with the porous carbon material. This first metal chloride $M^1Cl_{2X}$ is collected, for example, by cooling it to around room temperature in a cooler or the like.

Furthermore, powdery metal carbide $M^1C$ can be used in this step. In a process in which the first metal $M^1$ comes out of the metal carbide $M^1C$, the first metal $M^1$ at a deeper position from the surface of the metal carbide $M^1C$ takes a longer time for coming out. Since use of the powdery metal carbide $M^1C$ increases the surface area of the metal carbide $M^1C$ and makes the first metal $M^1$ efficiently coming out of the metal carbide $M^1C$, it can reduce the manufacturing time of the porous carbon material. It is noted that a possible average particle size of the metal carbide $M^1C$ is from 0.1 μm to 10 μm. Although particle sizes larger than it are possible depending upon applications, the diffusion-limited process of the chloride formed becomes prominent with the particle sizes over 500 μm, which is not preferred.

After the porous carbon forming step S11, the first metal reduction step S12 is carried out. The first metal reduction step S12 is to let the first metal chloride $M^1Cl_{2X}$ formed along with the porous carbon material in the porous carbon forming step S11, react with the second metal, thereby to reduce the first metal and extract the first metal $M^1$. When the second metal is represented by $M^2$, this first metal reduction step S12 is expressed by Chemical Formula (3) below. Here, Y is an integer of not less than 1.

$$M^1Cl_{2X} + YM^2 \rightarrow YM^2Cl_{2X/Y} + M^1 \qquad (3)$$

When the first metal $M^1$ is, for example, Si and the second metal $M^2$ is, for example, Zn, this first metal reduction step S12 is expressed by Chemical Formula (4) below.

$$SiCl_4 + 2Zn \rightarrow 2ZnCl_2 + Si \qquad (4)$$

In this step, the high-purity first metal $M^1$ is extracted from the first metal chloride $M^1Cl_{2X}$ by use of the so-called zinc reduction method. The second metal $M^2$ may be any element which can react with the first metal chloride $M^1Cl_{2X}$ to form a chloride and reduce the first metal $M^1$ and the chloride of which can be separated into chlorine gas and the second metal $M^2$ by electrolysis in the below-described second metal reduction step S14. For example, the second metal $M^2$ can be any one of a Group 1 element (which is also called a Group 1A element or alkali metal), a Group 2 element (which is also called a Group 2A element or alkali earth metal), a Group 11 element (which is also called a Group 1B element) such as Cu, and a Group 12 element (which is also called a Group 2B element) such as Zn. As specific examples, the Group 1 element is any one of Li, Na, K, Rb, and Cs; the Group 2 element is any one of Mg, Ca, Sr, Ba, and Ra; the Group 11 element is any one of Cu, Ag, and Au; the Group 12 element is any one of Zn, Cd, and Hg. Particularly, Zn is a desirable material because it does not form a solid solution with silicon in combination with $SiCl_4$, a chloride thereof has a relatively low melting point, and a vapor pressure of the metal is high. The metal can be one with a high vapor pressure and can be Zn, Mg, Na, K, Sr, or Ba. It is possible to adopt one a chloride of which has a low melting point and does not react with a base material. For it, Zn, Mg, Na, K, Ca, and Sr are suitable (cf. the table of FIG. 8 (the table showing the melting points and boiling points of metals and metal chlorides thereof)).

After the first metal reduction step S12, the metal carbide forming step S13 and the second metal reduction step S14 are carried out. It is noted that these steps may be carried out either one prior to the other, or may be carried out in parallel.

The metal carbide forming step S13 is to let the first metal $M^1$ extracted in the first metal reduction step S12, react with carbon, thereby to form a metal carbide $M^1C$. Here, the carbon material used in the metal carbide forming step S13 can be one readily available at low cost, e.g., carbon black or natural graphite. This metal carbide forming step S13 is expressed by Chemical Formula (5) below.

$$M^1 + C \rightarrow M^1C \qquad (5)$$

When the first metal $M^1$ is, for example, Si, this metal carbide forming step S13 is expressed by Chemical Formula (6) below.

$$Si + C \rightarrow SiC \qquad (6)$$

The metal carbide $M^1C$ extracted by this metal carbide forming step S13 is used again in the aforementioned porous carbon forming step S11.

Furthermore, the second metal reduction step S14 is to reduce the second metal $M^2$ of the second metal chloride ($M^2Cl_{2X/Y}$ in Chemical Formula (3) or $ZnCl_2$ in Chemical Formula (4)) formed along with the first metal $M^1$ in the first metal reduction step S12, thereby to extract the second metal $M^2$ and chlorine gas $Cl_2$. This second metal reduction step S14 is expressed by Chemical Formula (7) below.

$$M^2Cl_{2X/Y} \rightarrow M^2 + (X/Y)Cl_2 \qquad (7)$$

When the second metal $M^2$ is, for example, Zn, this second metal reduction step S14 is expressed by Chemical Formula (8) below.

$$ZnCl_2 \rightarrow Zn + Cl_2 \qquad (8)$$

In this step, for example, the second metal chloride $M^2Cl_{2X/Y}$ is electrolyzed in a high-temperature molten state, whereby the second metal chloride $M^2Cl_{2X/Y}$ is separated into the second metal $M^2$ and chlorine gas $Cl_2$. Then, the chlorine gas $Cl_2$ extracted by this second metal reduction step S14 is used again in the aforementioned porous carbon forming step S11. Furthermore, the second metal $M^2$ extracted by this second metal reduction step S14 is used again in the aforementioned first metal reduction step S12.

Figure 2:
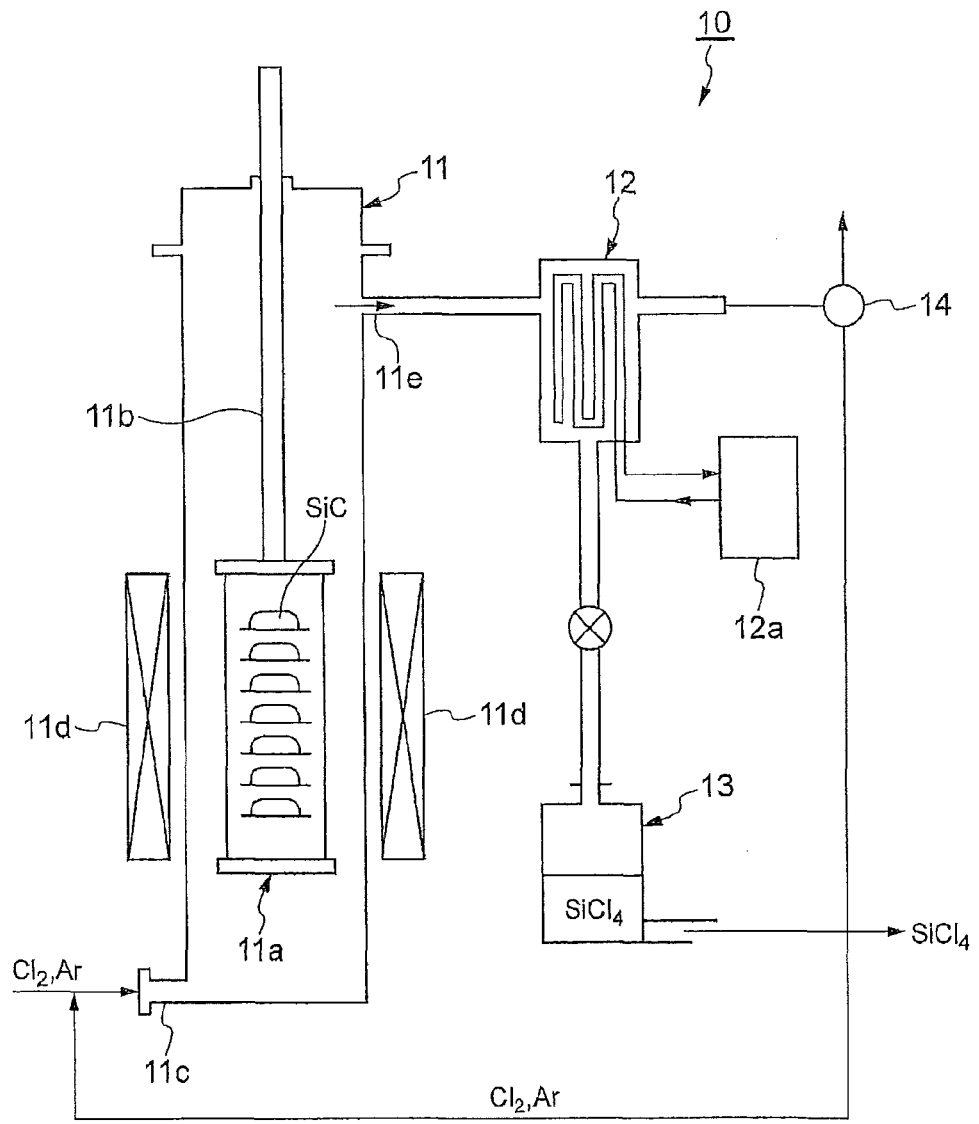
FIG. 2 is a drawing schematically showing a configuration of a porous carbon forming device 10 used in a porous carbon forming step.
Figure 3:
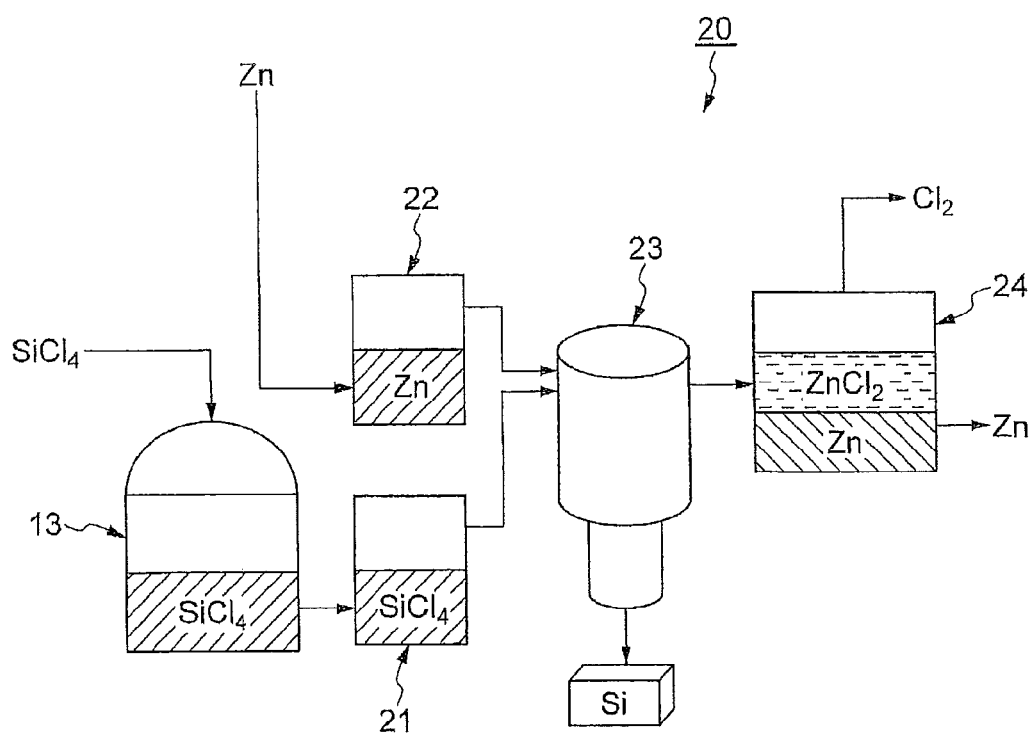
FIG. 3 is a drawing showing a simplified configuration of a zinc reduction device used in a first metal reduction step and a second metal reduction step.
Figure 4:
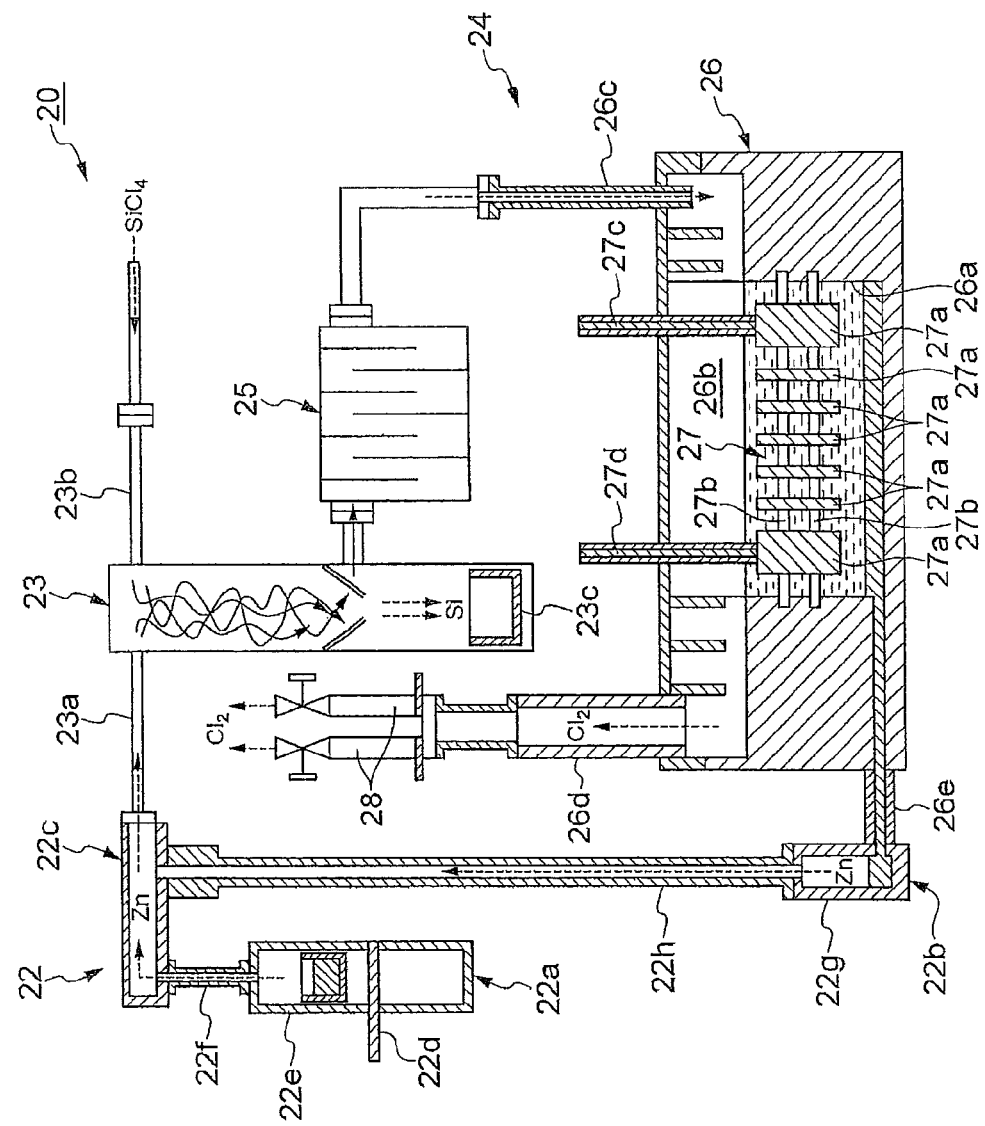
FIG. 4 is a drawing showing a specific configuration of the zinc reduction device.
Figure 5:
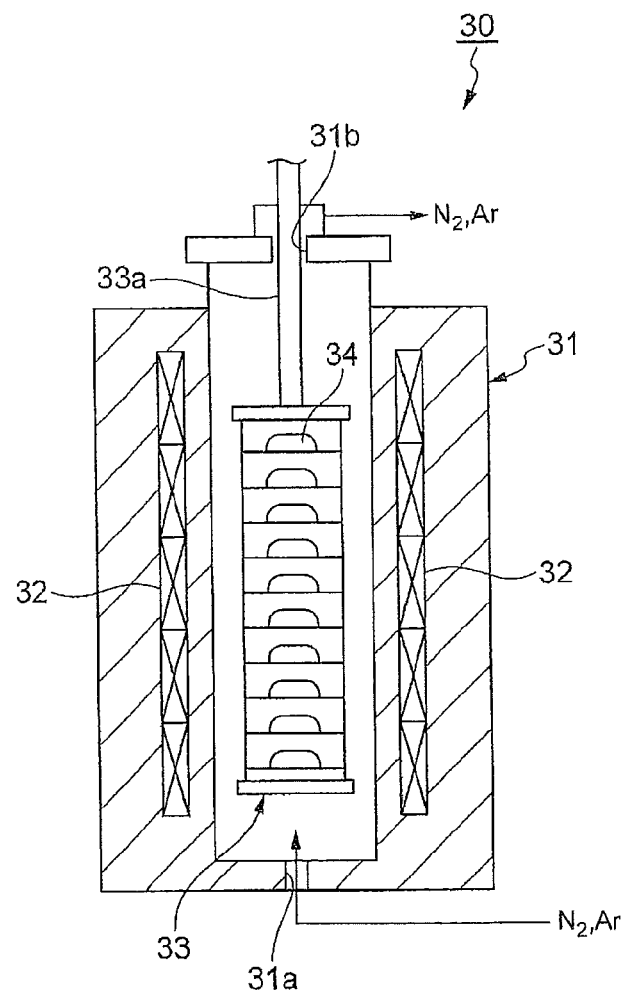
FIG. 5 is a drawing schematically showing a configuration of a metal carbide forming device used in a metal carbide forming step.

Now, the following will describe an example of a manufacturing device suitably used in the above-described process for manufacturing the porous carbon material. FIG. 2 is a drawing schematically showing a configuration of a porous carbon forming device 10 used in the porous carbon forming step S11. Furthermore, FIG. 3 is a drawing showing a simplified configuration of a zinc reduction device 20 used in the first metal reduction step S12 and the second metal reduction step S14 and FIG. 4 is a drawing showing a specific configuration of the zinc reduction device 20. FIG. 5 is a drawing schematically showing a configuration of a metal carbide forming device 30 used in the metal carbide forming step S13.

Referring first to FIG. 2, the porous carbon forming device 10 is provided with a reactor 11, a cooling trap 12, and a reservoir tank 13. A mount shelf 11a for mounting the metal carbide $M^1C$ on its multiple stages is housed in the reactor 11 and the mount shelf 11a is supported as pendent from top by a support rod 11b. A gas inlet port 11c is provided in a portion below the mount shelf 11a in the reactor 11 and mixed gas of chlorine gas $Cl_2$ and inert gas, or substantially 100% chlorine gas $Cl_2$ is introduced through this gas inlet port 11c into the reactor 11. Furthermore, a heater 11d is provided so as to surround the mount shelf 11a, outside the reactor 11. This heater 11d heats the reactor so that the mixed gas or chlorine gas around the metal carbide $M^1C$ is kept, for example, at a predetermined temperature not less than 500° C. and not more than 1500° C. A possible temperature range at this time is different depending upon a type of the metal carbide $M^1C$ and, for example, when the metal carbide $M^1C$ is SiC, the possible temperature range is not less than 900° C. and not more than 1600° C.

By the above treatment, the reaction of aforementioned Chemical Formula (1) or (2) takes place, whereby the first metal $M^1$ comes out of the metal carbide $M^1C$, to form the porous carbon material on the mount shelf 11a. The first metal chloride $M^1Cl_{2X}$ (SiCl$_4$ exemplified in the drawing) and the mixed gas (or chlorine gas) produced by the reaction are discharged through a gas exhaust port 11e provided in the upper part of the reactor 11, to the outside of the reactor 11. The gas exhaust port 11e is connected to the cooling trap 12 and the exhaust gas from the reactor 11 is cooled by a refrigerant 12a circulating in this cooling trap 12. Then, the cooled first metal chloride $M^1Cl_{2X}$ is reserved in the reservoir tank 13 and thereafter fed to the zinc reduction device 20. Furthermore, the mixed gas (or chlorine gas) having passed through the cooling trap 12 flows through a three-way valve 14 to be discharged to the outside of the porous carbon forming device 10 or to be fed again to the gas inlet port 11c of the reactor 11.

Next, referring to FIG. 3, the zinc reduction device 20 is provided with vaporizers 21 and 22, a reactor 23, and a molten salt electrolyzer 24. The first metal chloride $M^1Cl_{2X}$ (SiCl$_4$ exemplified in the drawing) reserved in the reservoir tank 13 of the aforementioned porous carbon forming device 10 is fed to the vaporizer 21 to vaporize. On the other hand, the second metal $M^2$ (Zn exemplified in the drawing) vaporizes in the vaporizer 22. The first metal chloride $M^1Cl_{2X}$ and the second metal $M^2$ vaporizing in this manner are fed to the reactor 23. Then, the first metal chloride $M^1Cl_{2X}$ and the second metal $M^2$ are allowed to react at a high temperature in the reactor 23, whereby the aforementioned reaction of Chemical Formula (3) or (4) takes place to extract the first metal $M^1$ (Si exemplified in the drawing) and produce the second metal chloride $M^2Cl_{2X/Y}$ (ZnCl$_2$ exemplified in the drawing). The second metal chloride $M^2Cl_{2X/Y}$ is fed to the molten salt electrolyzer 24, where the reaction of Chemical Formula (7) or (8) takes place by electrolysis, to separate the second metal chloride $M^2Cl_{2X/Y}$ into the second metal $M^2$ and chlorine gas $Cl_2$. The chlorine gas $Cl_2$ extracted in this manner is fed to the porous carbon forming device 10 and the second metal $M^2$ is fed to the vaporizer 22.

Referring to FIG. 4, a specific zinc reduction device 20 will be explained. In this zinc reduction device 20, the vaporizer 22 has a vaporizer 22a for introduction into system, a vaporizer 22b for continuous operation, and a collecting tube 22c. The vaporizer 22a for introduction into system has a gate valve 22d which allows the second metal $M^2$ (Zn exemplified in the drawing) to be introduced from the outside of the zinc reduction device 20. The second metal $M^2$ is stored to vaporize in a vaporization chamber 22e of the vaporizer 22a for introduction into system. The vaporization chamber 22e and the collecting tube 22c are connected to each other by a tube 22f. Furthermore, the vaporizer 22b for continuous operation has a vaporization chamber 22g which stores and vaporizes the second metal $M^2$ extracted from the molten salt electrolyzer 24. The vaporization chamber 22g and the collecting tube 22c are connected to each other by a tube 22h.

The vaporizer 22a for introduction into system and the tube 22h of the vaporizer 22b for continuous operation are comprised, for example, of a ceramic (alumina or the like). Furthermore, the vaporization chamber 22g of the vaporizer 22b for continuous operation and the collecting tube 22c are comprised, for example, of carbon. The vaporizer 22a for introduction into system, the vaporizer 22b for continuous operation, and the collecting tube 22c are heated at a high temperature from 900° C. to 1000° C.

The reactor 23 is, for example, a quartz container. The upper part of the reactor 23 is connected through a quartz tube 23a to the collecting tube 22c of the vaporizer 22 and the vaporized second metal $M^2$ is fed through the tube 23a to the reactor 23. Furthermore, the first metal chloride $M^1Cl_{2X}$ flows through a quartz tube 23b into the upper part of the reactor 23. The reactor 23 is heated at a high temperature from 1200° C. to 1400° C. and inside the reactor 23, the second metal $M^2$ and the first metal chloride $M^1Cl_{2X}$ react with each other. The resulting first metal $M^1$ is stored in an unheated container 23c provided inside the reactor 23. Furthermore, the second metal chloride $M^2Cl_{2X/Y}$ passes through a particulate trap 25 for removing particulates of the first metal $M^1$ and then is fed to the molten salt electrolyzer 24. The particulate trap 25 is comprised, for example, of quartz and is heated at a high temperature from 900° C. to 1000° C.

The molten salt electrolyzer 24 is provided with a main body part 26 and an electrode structure 27. The main body part 26 has an electrolysis tank 26a for storing and electrolyzing the molten second metal chloride $M^2Cl_{2X/Y}$, and a heater (not shown) which is a heat source for heating the inside of the electrolysis tank 26a. There is a space 26b provided above the electrolysis tank 26a, a tube 26c connected to the particulate trap 25 is arranged at one horizontal end of the space 26b, and a tube 26d (demister) is arranged at the other end. The second metal chloride $M^2Cl_{2Y/Y}$ introduced through the tube 26c is guided into the electrolysis tank 26a. The chlorine gas $Cl_2$ generated in the electrolysis tank 26a is guided through the space 26b to be discharged from the tube 26d. As shown in the drawing, a filter 28 made of Teflon is disposed at the tip of the tube 26d. Furthermore, a tube 26e is connected to the bottom part of the electrolysis tank 26a and the high-purity second metal $M^2$ deposited on the bottom of the electrolysis tank 26a is fed through this tube 26e to the vaporizer 22b for continuous operation.

The electrode structure 27 has a plurality of electrode plates 27a. The plurality of electrode plates 27a are juxtaposed in the plate thickness direction with a gap in between and arranged in the electrolysis tank 26a with the plate thickness direction being set along the horizontal direction. The plurality of electrode plates 27a are comprised of an electro-conductive material resistant to high temperature and corrosion-resistant to chlorine, e.g., a high-purity carbon material, and are penetrated by one or more rod-like members 27b extending in the horizontal direction, thereby maintaining mutual positional relationship.

A predetermined positive voltage is applied to the electrode plate 27a located at one horizontal end, out of the plurality of electrode plates 27a, through a conducting member 27c electrically connected to the electrode plate 27a, and this electrode plate 27a functions as an anode. Furthermore, a predetermined negative voltage is applied to the electrode plate 27a located at the other horizontal end, through a conducting member 27d electrically connected to the electrode plate 27a, and this electrode plate 27a functions as a cathode. The electrode plates 27a arranged between these anode and cathode are given a potential gradient between the aforementioned positive voltage and negative voltage through an unshown conducting member, and each of these electrode plates 27a functions as an intermediate electrode.

The second metal chloride $M^2Cl_{2X/Y}$ introduced through the tube 26c is taken into the electrolysis tank 26a. Since the interior of the electrolysis tank 26a is kept at a high temperature, e.g., from 500° C. to 700° C., by a heater, the second metal chloride $M^2Cl_{2X/Y}$ is maintained in the molten state as it is. Furthermore, the plurality of electrode plates 27a are arranged inside the electrolysis tank 26a and the plurality of electrode plates 27a are immersed in the molten second metal chloride $M^2Cl_{2X/Y}$. Then, when each electrode plate 27a is given a predetermined potential difference, an electric current flows in the second metal chloride $M^2Cl_{2X/Y}$ through opposed faces (electrolytic faces) of the respective adjacent electrode plates 27a, whereby the second metal chloride $M^2Cl_{2X/Y}$ is electrolyzed into chlorine $Cl_2$ and the second metal $M^2$. Since the second metal $M^2$ formed in this manner has the specific gravity larger than that of the melt of the second metal chloride $M^2Cl_{2X/Y}$, it is deposited on the bottom of the electrolysis tank 26a and fed through the tube 26e to the vaporizer 22b for continuous operation. Furthermore, the generated chlorine $Cl_2$ moves as chlorine gas to the upper part of the electrolysis tank 26a and is fed through the tube 26d to the porous carbon forming device 10.

Next, referring to FIG. 5, the metal carbide forming device 30 is provided with a reactor 31 extending vertically, a heater 32 buried in a side wall of the reactor 31, and a mount shelf 33 located in the reactor 31. The mount shelf 33 has a plurality of stages on which mixtures 34 of the first metal $M^1$ and a carbon material (e.g., carbon black, natural graphite, or the like) are mounted. The mount shelf 33 is supported as pendent from top by a support rod 33a.

An inlet port 31a is provided in the lower part of the reactor 31 and an inert gas ($N_2$, He, Ar, Ne, Xe, or the like) is introduced through this inlet port 31a. This inert gas moves upward in the reactor 31 to be discharged through an exhaust port 31b provided in the upper part of the reactor 31.

The heater 32 is arranged so as to surround the periphery of the mount shelf 33 and heats the mixtures 34 mounted on the mount shelf 33. Possible temperatures of the mixtures 34 in this step are from 1400° C. to 1800° C. By this, the reaction of Chemical Formula (5) or (6) takes place to coupe the first metal $M^1$ and carbon to each other, thereby forming the metal carbide $M^1C$.

The below will describe effects achieved by the process for manufacturing the porous carbon material according to the present embodiment. In the present embodiment, as described above, the porous carbon forming step S11 is to react the metal carbide (e.g., SiC) with chlorine gas ($Cl_2$) to form porous carbon. During this step, the first metal chloride (e.g., $SiCl_4$) is formed at the same time. This first metal chloride is reduced by the first metal reduction step S12 to extract the first metal (e.g., Si). The first metal produced in this manner is carbonized in the metal carbide forming step S13 to form the metal carbide (e.g., SiC). This metal carbide is used again in the aforementioned porous carbon forming step S11.

Furthermore, the second metal chloride (e.g., $ZnCl_2$) is also formed in the first metal reduction step S12 and this second metal chloride is reduced in the second metal reduction step S14 to be separated into the second metal (e.g., Zn) and chlorine gas ($Cl_2$). The second metal obtained in this manner is used again in the aforementioned first metal reduction step S12. Furthermore, the chlorine gas is used again in the aforementioned porous carbon forming step S11.

In the process for manufacturing the porous carbon material according to the present embodiment, as described above, all the materials other than carbon, which are used in forming porous carbon, can be recycled and reused. Therefore, this manufacturing process can enhance efficiency of raw materials, reduce the environmental burden, and keep the production cost down. The porous carbon material manufactured by this process can be widely applied, for example, to electrodes of batteries, electric double layer capacitors, and others, catalyst carriers, activated carbon, and so on.

Modification Example

Figure 6:
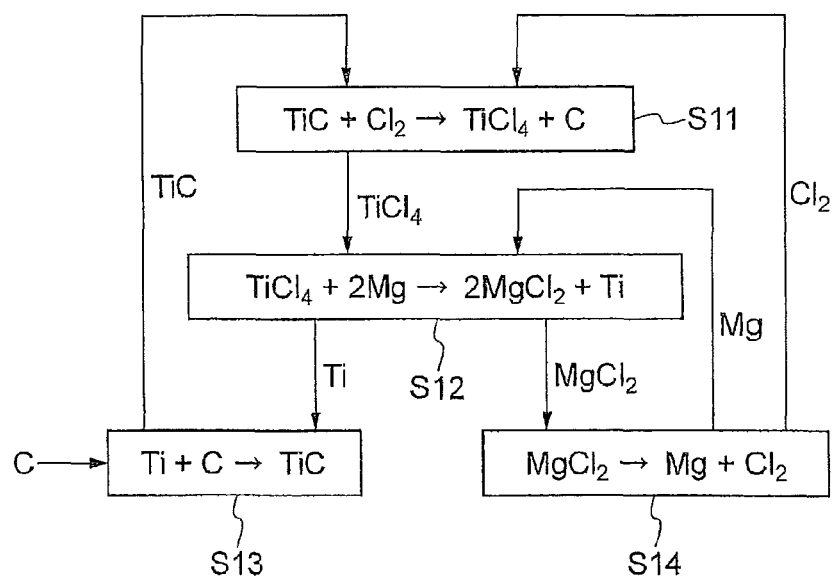
FIG. 6 is a drawing showing each of steps in one modification example of the foregoing embodiment.

FIG. 6 is a drawing showing each of steps in one modification example of the above embodiment. As shown in FIG. 6, the manufacturing process according to the present modification example, like the above embodiment, has the porous carbon forming step S11, the first metal reduction step S12, the metal carbide forming step S13, and the second metal reduction step S14, and these steps S11 to S14 are repetitively carried out to produce the porous carbon material.

In the present modification example, TiC is used as the metal carbide in the porous carbon forming step S11. Namely, this porous carbon forming step S11 is expressed by Chemical Formula (9) below.

$$TiC + 2Cl_2 \rightarrow TiCl_4 + C \tag{9}$$

This step results in obtaining $TiCl_4$ as the first metal chloride, along with the porous carbon material. This $TiCl_4$ is cooled to around room temperature in a cooler or the like to be collected.

After the porous carbon forming step S11, the first metal reduction step S12 is carried out. In the present modification example, Mg is used as the second metal. Namely, this first metal reduction step S12 is expressed by Chemical Formula (10) below.

$$TiCl_4 + 2Mg \rightarrow 2MgCl_2 + Ti \tag{10}$$

In this step, high-purity Ti is extracted from $TiCl_4$.

After the first metal reduction step S12, the metal carbide forming step S13 and the second metal reduction step S14 are carried out. It is noted that these steps may be carried out either one prior to the other, or may be carried out in parallel.

The metal carbide forming step S13 is to react Ti extracted in the first metal reduction step S12, with carbon, to produce TiC. This metal carbide forming step S13 is expressed by Chemical Formula (11) below.

$$Ti + C \rightarrow TiC \tag{11}$$

TiC extracted by this metal carbide forming step S13 is used again in the aforementioned porous carbon forming step S11.

Furthermore, the second metal reduction step S14 is to reduce Mg of $MgCl_2$ formed along with Ti in the first metal reduction step S12, thereby to extract Mg and chlorine gas $Cl_2$. This second metal reduction step S14 is expressed by Chemical Formula (12) below.

$$MgCl_2 \rightarrow Mg + Cl_2 \quad (12)$$

The chlorine gas $Cl_2$ extracted by this second metal reduction step S14 is used again in the aforementioned porous carbon forming step S11. Furthermore, Mg extracted by this second metal reduction step S14 is used again in the aforementioned first metal reduction step S12.

When the first metal is changed from Si to Ti as in the present modification example, all the materials other than carbon are also recycled and reused, achieving the same effects as in the aforementioned embodiment.

Example 1

The following will describe an example of actually manufacturing the porous carbon material according to the above embodiment. In this example, activated carbon was used as a carbon raw material used in the metal carbide forming step S13. This activated carbon was one having the average particle size of 20 μm and the specific surface area of 80 $m^2/g$. Mixtures of this carbon raw material and metal silicon particles were mounted on the mount shelf of carbon and this mount shelf was inserted into the reactor set at 900° C. At this time, the atmosphere gas in the reactor was nitrogen gas ($N_2$). After the insertion, the temperature in the reactor was raised at a temperature rise rate of 10° C./min to 1450° C. to melt the metal silicon particles and in that state, reaction was continued for five hours. A product obtained in this manner was β-SiC.

Figure 11:
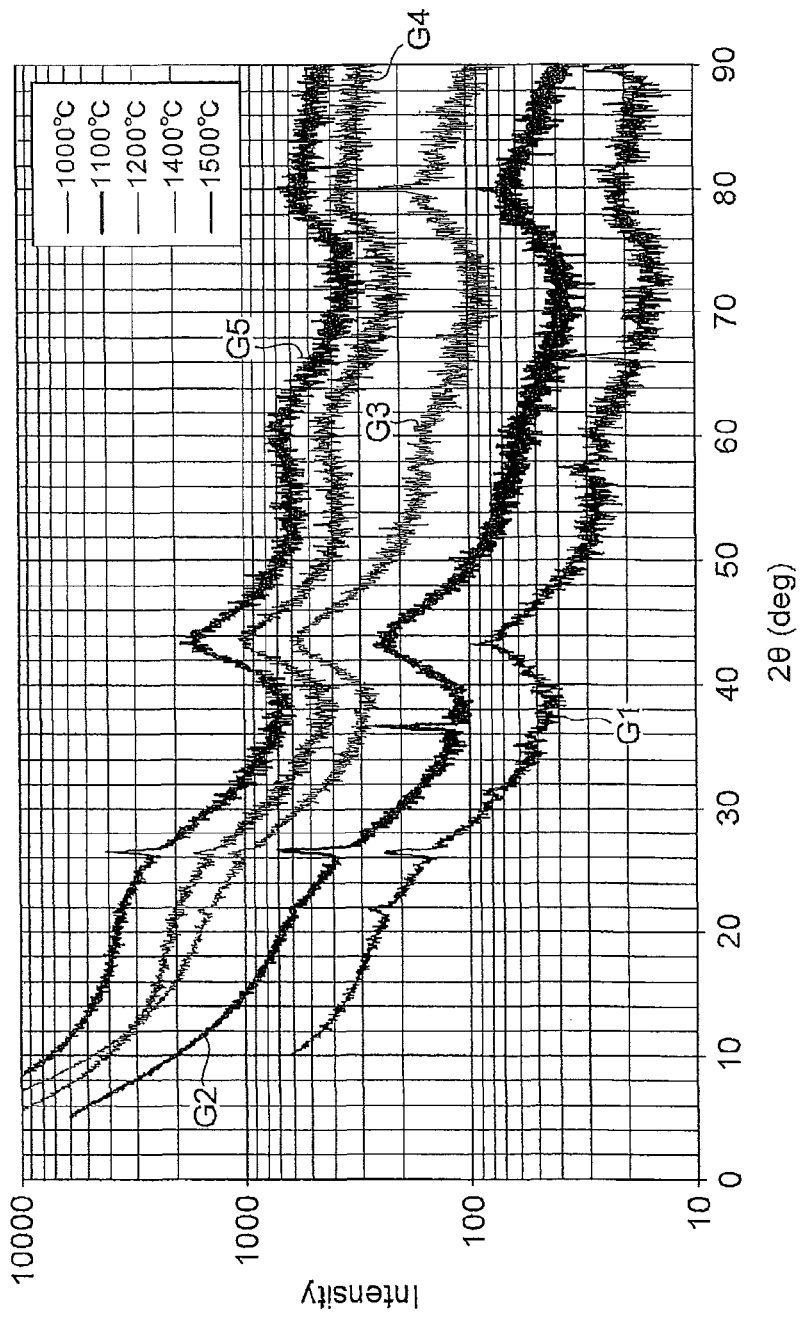
FIG. 11 is a drawing showing X-ray diffraction diagrams of crystal phases of carbon materials formed.

SiC obtained in this manner was pulverized to the particle size of 10 μm and then set on the carbon mount shelf of an electric furnace having a core tube of quartz glass. Then, a chlorine gas flow rate was set to 1000 ml/min, an Ar gas flow rate to 5000 ml/min, and a one-hour treatment was carried out at a predetermined temperature. At this time, a cooling trap set at −20° C. was provided at an exhaust port of the core tube, and $SiCl_4$ was liquefied by this cooling trap and dripped into a container. Furthermore, $Cl_2$ remaining unreacted with SiC in the core tube was guided via a three-way valve set on the exit side of the cooling trap, to flow back to the core tube. This formation of $SiCl_4$ was finished about 50 minutes after the temperature rise. Thereafter, the chlorine gas in the core tube was removed by Ar gas, the carbon mount shelf was lifted up and cooled to the temperature of 400° C., and thereafter the product was taken into the atmosphere. Adsorption isotherms were measured by the nitrogen adsorption method, for porous materials obtained at different treatment temperatures varying at 100° C. steps in the range of 900° C. to 1500° C., and then, from adsorbed amounts obtained, the pore volume, the specific surface area by the BET method, and the average pore size by the t-plot method were calculated, the results of which are shown in the table of FIG. 9 (changes in surface physical properties depending upon temperatures of the chlorine treatment (with the SiC raw material and the treatment time of one hour). According to the table of FIG. 9, at low treatment temperatures the reaction does not proceeds completely and a large surface area is not obtained in a time appropriate for manufacture. Furthermore, decrease in specific surface area and pore volume and increase in pore size are confirmed at and above 1300° C. It was confirmed from these that a proper temperature condition was needed for increase in specific surface area and in the case of the SiC raw material, it took the values of not less than 1100 $m^2/g$ at 1000 to 1300° C. FIG. 11 shows X-ray diffraction diagrams of crystal phases of carbon materials formed. FIG. 11 shows X-ray diffraction wave patterns ($CuK_\alpha$) of porous carbon materials from the SiC raw material, in which lines indicate the results of the respective porous carbon materials obtained at different treatment temperatures. In FIG. 11, the vertical axis represents relative indication of X-ray diffraction intensity and the horizontal axis diffraction angle 2θ (deg). In FIG. 11, wave pattern G1 shows the measurement result at the treatment temperature 1000° C., wave pattern G2 the measurement temperature at the treatment temperature 1100° C., wave pattern G3 the measurement temperature at the treatment temperature 1200° C., wave pattern G4 the measurement result at the treatment temperature 1400° C., and wave pattern G5 the measurement result at the treatment temperature 1500° C. The process of forming the carbon materials, used in FIG. 11, is expressed by Chemical Formula (13) below.

$$SiC + 2Cl_2 \rightarrow SiCl_4 + C \quad (13)$$

It is confirmed in the case of the SiC raw material that there are a broad peak in the region of diffraction angle of 20 to 30° and a peak around 43°. Sharp peaks at 22° and 26.2° are crystal phases of $SiO_2$ component (rock crystal or cristobalite) contained in the raw material. The (002) diffraction line of graphite appears around 26°, and the peak position from 20 to 30° after removal of low-angle scattering of not more than 10° ranges from 20 to 22°, demonstrating the surface separation different from that of the graphite crystal. While the pore size and others show significant changes, no significant difference is observed in the X-ray diffraction wave patterns in the range up to 1500° C.

Next, $SiCl_4$ liquefied by the cooling trap was heated to 80° C. to vaporize and, thereafter, this $SiCl_4$ and Zn vapor were allowed to react in the reaction vessel kept at the temperature of 950° C. By this reaction, aciculate metal silicon (Si) was formed in the reaction vessel. $ZnCl_2$ discharged from the reaction vessel was liquefied in the trap tank (at 550° C.) and then $ZnCl_2$ was decomposed by DC electrolysis (with the electrode gap of 10 mm and the voltage of 1.5 V). The chlorine gas formed by this electrolysis was taken out through the filter and compressed (under the pressure of 10 atmospheres) to be liquefied in the chlorine gas reserving tank. Furthermore, Zn in a molten state collected in the lower part of the electrolyzer was fed to the vaporizer.

After metal silicon (Si) obtained by the above step was collected, it was heated to 1450° C. in vacuum to melt, and then cooled to solidify. The metal silicon (Si) thus solidifying was subjected to analysis, whereby the purity thereof was found to be an extremely high value, 99.9995%, and Zn and oxygen were confirmed as impurities therein.

Example 2

The following will describe an example of the porous carbon material from TiC. In this example, activated carbon was used as a carbon raw material used in the metal carbide forming step S13. This activated carbon was one having the average particle size of 20 μm and the specific surface area of 800 $m^2/g$. Mixtures of this carbon raw material and metal titanium particles were mounted on the mount shelf of carbon and this mount shelf was inserted into the reactor set at 900° C. At this time, the atmosphere gas in the reactor was nitrogen gas ($N_2$). After the insertion, the temperature in the reactor was raised at a temperature rise rate of 10° C./min to 1550° C.

to melt the metal silicon particles and in that state, reaction was continued for five hours. A product obtained in this manner was TiC.

Figure 12:
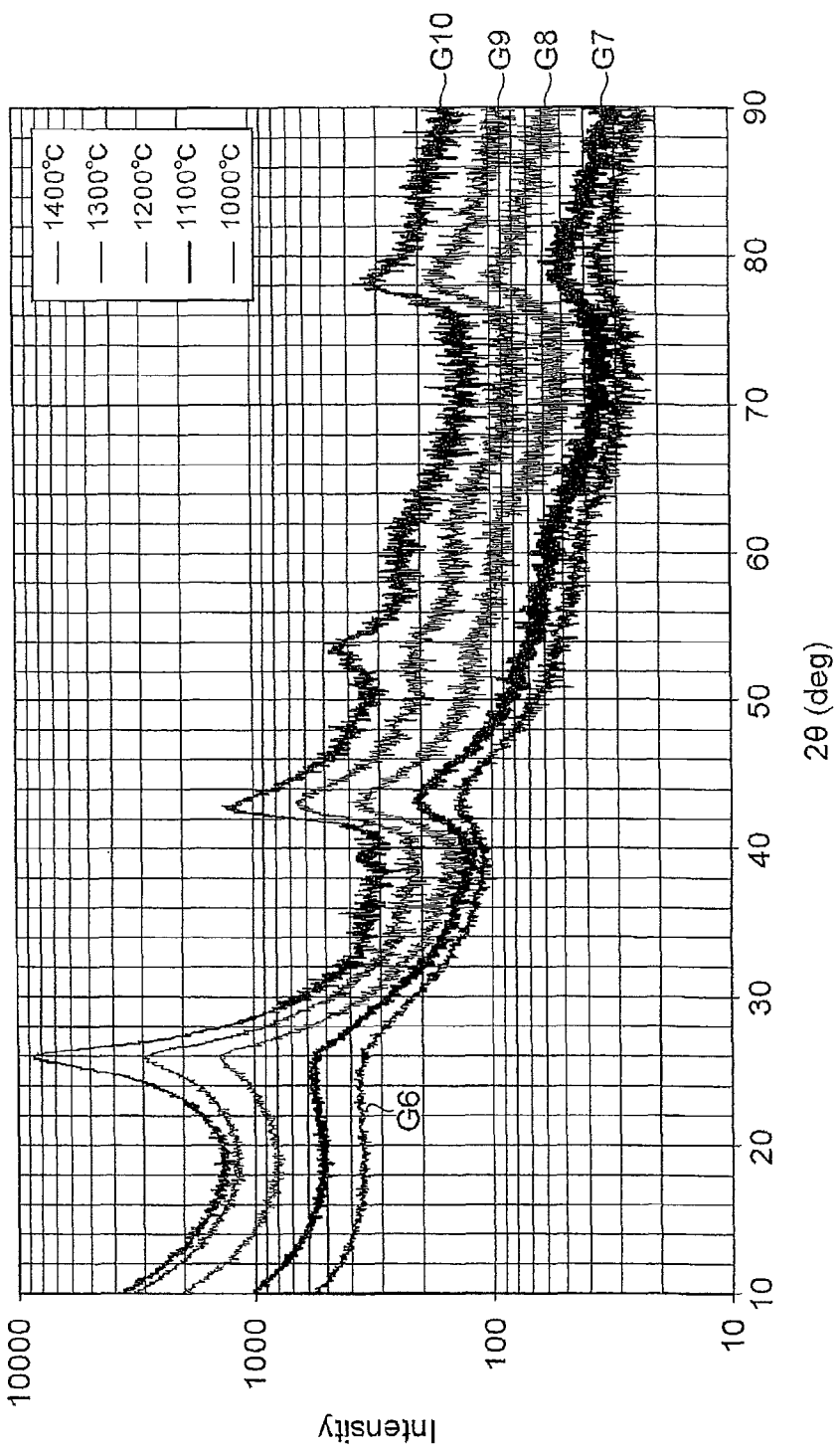
FIG. 12 is a drawing showing X-ray diffraction diagrams of crystal phases of carbon materials formed.

TiC obtained in this manner was pulverized to the particle size of 10 μm and then set on the carbon mount shelf of an electric furnace having a core tube of quartz glass. Then, a chlorine gas flow rate was set to 1000 ml/min, an Ar gas flow rate to 5000 ml/min, and a one-hour treatment was carried out at a predetermined temperature. At this time, the cooling trap set at −20° C. was provided at the exhaust port of the core tube, and TiCl$_4$ was liquefied by the cooling trap and dripped into the container. Furthermore, Cl$_2$ remaining unreacted with TiC in the core tube was guided via the three-way valve set on the exit side of the cooling trap, to flow back to the core tube. This formation of TiCl$_4$ was finished about 50 minutes after the temperature rise. Thereafter, the chlorine gas in the core tube was removed by Ar gas, the carbon mount shelf was lifted up and cooled to the temperature of 400° C., and thereafter the product was taken into the atmosphere. Adsorption isotherms were measured by the nitrogen adsorption method, for porous materials obtained at different treatment temperatures varying at 100° C. steps in the range of 800° C. to 1400° C., and then, from adsorbed amounts obtained, the pore volume, the specific surface area by the BET method, and the average pore size by the t-plot method were calculated, the results of which are shown in the table of FIG. 10 (changes in surface physical properties depending upon temperatures of the chlorine treatment (with the TiC raw material and the treatment time of one hour). According to the table of FIG. 10, decrease in specific surface area and pore volume and increase in pore size are confirmed at and above 1000° C. It was confirmed from these that a proper temperature condition was needed for increase in specific surface area and, in the case of the TiC raw material, it took the values of not less than 1100 m$^2$/g at 800 to 1100° C. FIG. 12 shows X-ray diffraction diagrams of crystal phases of carbon materials formed. FIG. 12 shows X-ray diffraction wave patterns (CuK$_\alpha$) of porous carbon materials from the TiC raw material, in which lines indicate the results of the porous carbon materials obtained at different treatment temperatures. In FIG. 12, the vertical axis represents relative indication of X-ray diffraction intensity and the horizontal axis diffraction angle 2θ (deg). In FIG. 12, wave pattern G6 shows the measurement result at the treatment temperature 1000° C., wave pattern G7 the measurement temperature at the treatment temperature 1100° C., wave pattern G8 the measurement temperature at the treatment temperature 1200° C., wave pattern G9 the measurement result at the treatment temperature 1300° C., and wave pattern G10 the measurement result at the treatment temperature 1400° C. The process of forming the carbon materials, used in FIG. 12, is expressed by Chemical Formula (14) below.

$$TiC+2Cl_2 \rightarrow TiCl_4+C \qquad (14)$$

It is confirmed in the case of the TiC raw material that there are a broad peak in the region of diffraction angle of 26° and a peak around 43°. The (002) diffraction line of graphite appears around 26°, and it was confirmed that increase in treatment temperature led to growth of graphite crystal, thereby causing decrease in specific surface area.

Next, TiCl$_4$ liquefied by the cooling trap was heated to 90° C. to vaporize and, thereafter, this TiCl$_4$ and Mg vapor were allowed to react in the reaction vessel kept at the temperature of 950° C. By this reaction, acicular metal titanium (Ti) was formed in the reaction vessel. MgCl$_2$ discharged from the reaction vessel was liquefied in the trap tank (at 750° C.) and then MgCl$_2$ was decomposed by DC electrolysis (with the electrode gap of 10 mm and the voltage of 1.5 V). The chlorine gas formed by this electrolysis was taken out through the filter and compressed (under the pressure of 10 atmospheres) to be liquefied in the chlorine gas reserving tank. Furthermore, Mg in a molten state collected in the lower part of the electrolyzer was fed to the vaporizer.

After metal titanium (Ti) obtained in the above step was collected, it was heated to 1750° C. in vacuum to melt, and then cooled to solidify. The metal titanium (Si) thus solidifying was subjected to analysis, whereby the purity thereof was found to be an extremely high value, 99.95%, and Mg and oxygen were confirmed as impurities therein.

The process for manufacturing the porous carbon material according to the present invention does not have to be limited to the above embodiment but can be modified in many other ways. For example, the metal carbide used in the porous carbon forming step and the second metal used in the first metal reduction step are not limited to those exemplified in the above embodiment.

INDUSTRIAL APPLICABILITY

The present invention is applicable to processes for manufacturing porous carbon materials, which can reduce the environmental burden while keeping the production cost down.

REFERENCE SIGNS LIST

10 . . . porous carbon forming device; 11 . . . reactor; 12 . . . cooling trap; 13 . . . reservoir tank; 14 . . . three-way valve; 20 . . . zinc reduction device; 21, 22 . . . vaporizers; 23 . . . reactor; 24 . . . molten salt electrolyzer; 25 . . . particulate trap; 26 . . . main body part; 27 . . . electrode structure; 28 . . . filter; 30 . . . metal carbide forming device; 31 . . . reactor; 32 . . . heater; 22 . . . mount shelf; 34 . . . mixtures.

What is claimed is:

1. A process for manufacturing a porous carbon material, comprising:
   a porous carbon forming step of performing a heating treatment in a contact state of a metal carbide, which is a compound of a first metal and carbon, with chlorine gas, to form a porous carbon material;
   a first metal reduction step of reacting a first metal chloride formed along with the porous carbon material in the porous carbon forming step, with a second metal, to extract the first metal; and
   a metal carbide forming step of reacting the first metal extracted in the first metal reduction step, with carbon to form the metal carbide,
   the process further comprising:
   a second metal reduction step of reducing a second metal chloride formed along with the first metal in the first metal reduction step, to extract the second metal and chlorine gas, after the first metal reduction step.

2. The process for manufacturing the porous carbon material according to claim 1, wherein the porous carbon forming step, the first metal reduction step, the metal carbide forming step, and the second metal reduction step are repetitively carried out, wherein the metal carbide extracted by the metal carbide forming step is used in the porous carbon forming step, wherein the chlorine gas extracted by the second metal reduction step is used in the porous carbon forming step, and wherein the second metal extracted by the second metal reduction step is used in the first metal reduction step.

3. The process for manufacturing the porous carbon material according to claim 1, wherein the metal carbide used in the porous carbon forming step is a powdery or porous body.

4. The process for manufacturing the porous carbon material according to claim 1, wherein the metal carbide includes at least one of $Al_4C_3$, $B_4C$, $CaC_2$, $Cr_3C_2$, $Fe_3C$, SiC, $ThC_2$, TiC, $UC_2$, WC, and MoC.

5. The process for manufacturing the porous carbon material according to claim 1, wherein the porous carbon forming step is carried out in such a manner that the metal carbide is placed in a mixed gas atmosphere of the chlorine gas and an inert gas, or in an atmosphere of the chlorine gas and that the mixed gas atmosphere or the chlorine gas atmosphere is heated at a temperature of not less than 500° C. and not more than 1500° C.

6. The process for manufacturing the porous carbon material according to claim 1, wherein the porous carbon forming step is carried out in such a manner that the metal carbide is SiC, that the metal carbide is placed in a mixed gas atmosphere of the chlorine gas and an inert gas, or in an atmosphere of the chlorine gas, and that the mixed gas atmosphere or the chlorine gas atmosphere is heated at a temperature of not less than 900° C. and not more than 1300° C.

7. The process for manufacturing the porous carbon material according to claim 1, wherein the porous carbon forming step is carried out in such a manner that the metal carbide is TiC, that the metal carbide is placed in a mixed gas atmosphere of the chlorine gas and an inert gas, or in an atmosphere of the chlorine gas, and that the mixed gas atmosphere or the chlorine gas atmosphere is heated at a temperature of not less than 600° C. and not more than 1000° C.

8. The process for manufacturing the porous carbon material according to claim 1, wherein the second metal is any one of a Group 1 element, a Group 2 element, a Group 11 element, and a Group 12 element.

9. The process for manufacturing the porous carbon material according to claim 1, wherein in the porous carbon forming step, the metal carbide is SiC and the second metal is Zn.

10. The process for manufacturing the porous carbon material according to claim 1, wherein in the porous carbon forming step, the metal carbide is TiC and the second metal is Mg.

* * * * *